United States Patent [19]

Le Sausse et al.

[11] 4,354,293
[45] Oct. 19, 1982

[54] ARM TO BLADE CONNECTOR

[75] Inventors: Robert T. Le Sausse, Brussels; Johan H. Van den Berg, Hasselt, both of Belgium

[73] Assignee: Champion Spark Plug Europe S.A., Virton, Belgium

[21] Appl. No.: 223,374

[22] Filed: Jan. 8, 1981

[30] Foreign Application Priority Data

Feb. 13, 1980 [FR] France .................................. 80 03157

[51] Int. Cl.³ .............................................. B60S 1/40
[52] U.S. Cl. ................................................. 15/250.32
[58] Field of Search ......................... 15/250.32–250.42

[56] References Cited

U.S. PATENT DOCUMENTS

| | | | |
|---|---|---|---|
| 3,576,044 | 4/1971 | Besnard | 15/250.32 |
| 4,023,232 | 5/1977 | Smithers | 15/250.32 |
| 4,083,642 | 4/1978 | Journee | 403/316 |
| 4,114,227 | 9/1978 | Blackman | 15/250.32 |
| 4,118,825 | 10/1978 | Hoebrechts et al. | 15/250.32 |
| 4,224,001 | 9/1980 | Arndt et al. | 403/163 |

FOREIGN PATENT DOCUMENTS

| | | |
|---|---|---|
| 12847 | 7/1980 | European Pat. Off. ......... 15/250.32 |
| 2057213 | 9/1971 | Fed. Rep. of Germany . |
| 2251453 | 5/1973 | Fed. Rep. of Germany . |
| 2306218 | 8/1973 | Fed. Rep. of Germany . |
| 1655992 | 2/1976 | Fed. Rep. of Germany . |
| 1376423 | 9/1964 | France . |
| 2426598 | 12/1979 | France . |
| 1293926 | 10/1972 | United Kingdom . |

Primary Examiner—Peter Feldman
Attorney, Agent, or Firm—Wegner, McCord, Wood & Dalton

[57] ABSTRACT

A connecting device for attaching a windshield wiper blade to at least two different types of wiper arms is provided. The connecting device seats on a cross pin of the wiper blade and has a unique opening therein for receiving one of several different style pivot pins. Each pivot pin may be inserted on either side of the connecting device and has a projecting portion for attaching an appropriate wiper arm thereto. Each pivot pin has a unique end portion for attaching the pin in the unique opening in the connecting device.

12 Claims, 20 Drawing Figures

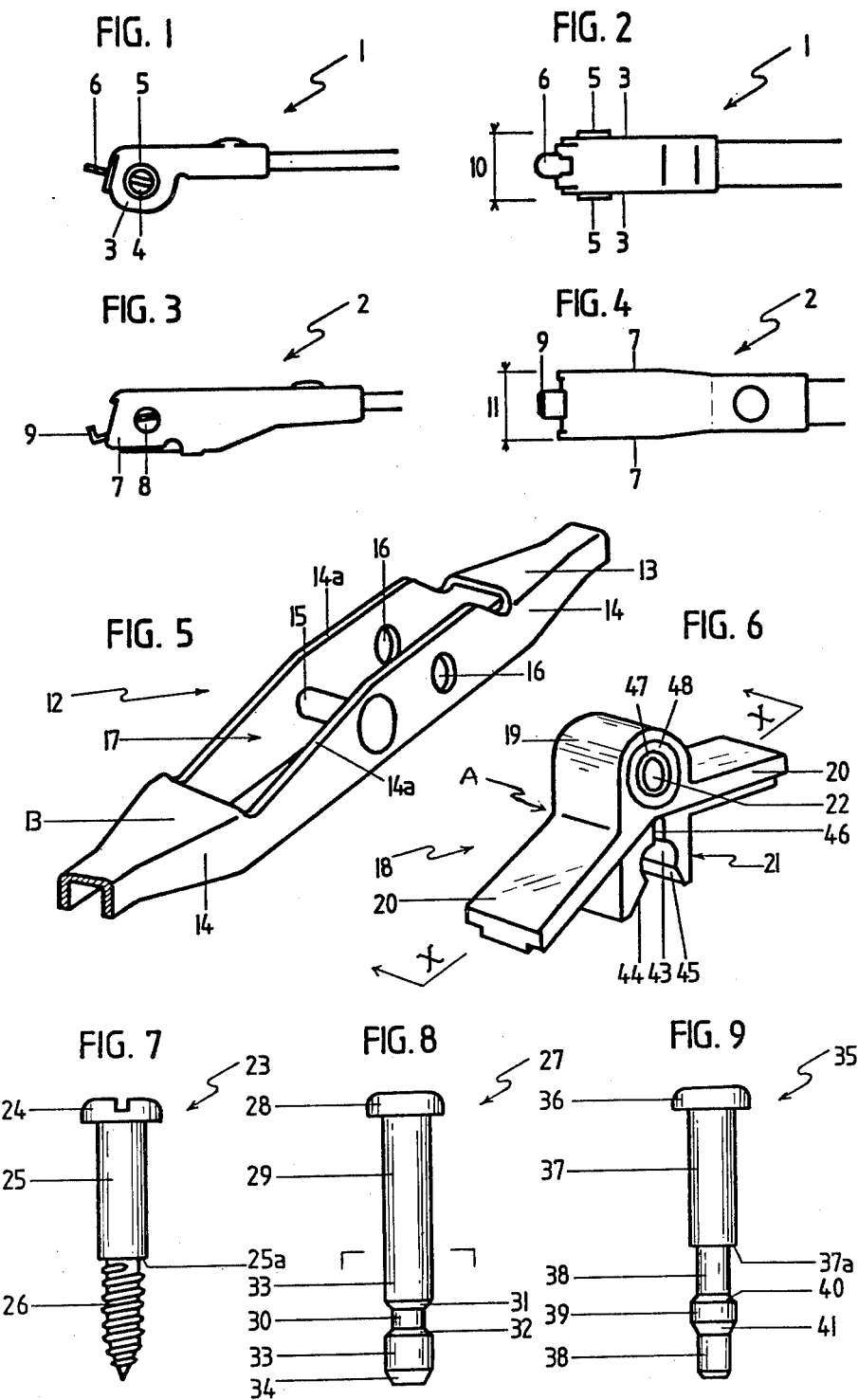

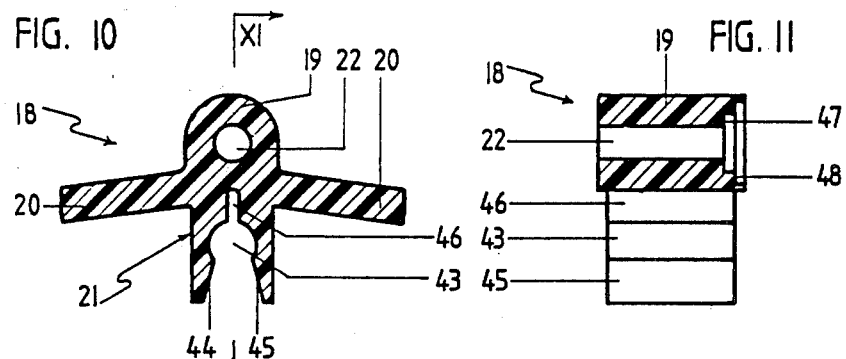

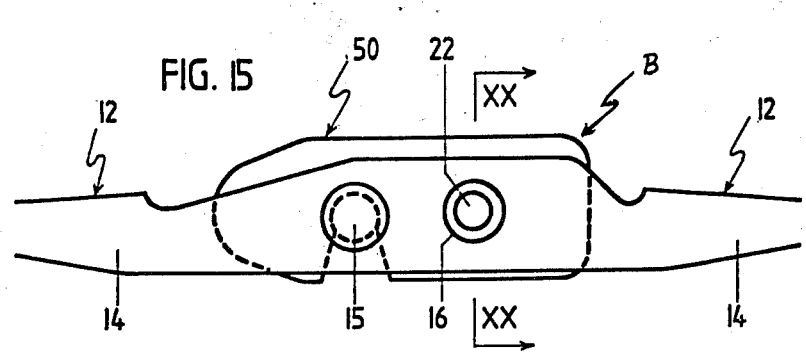
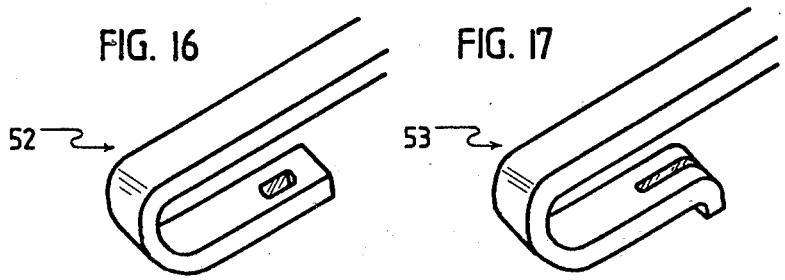
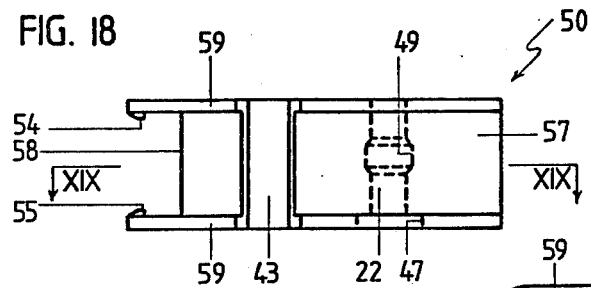
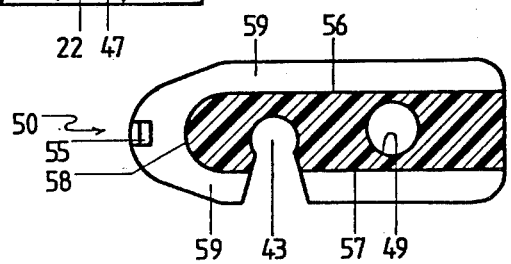
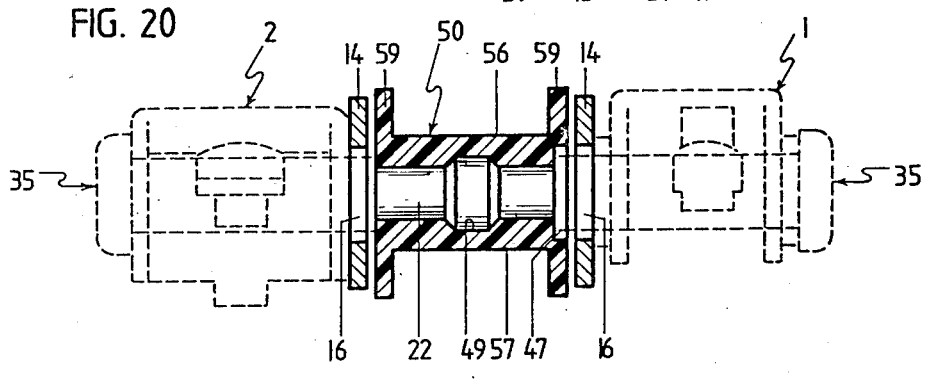

4,354,293

ARM TO BLADE CONNECTOR

DESCRIPTION

1. Technical Field

The present invention relates to a connecting device or connector for attaching a wiper blade to a corresponding wiper arm, such as used, for example, on motor vehicles.

2. Background Art

On the wiper blade market, several types of wiper arms exist, each type being essentially characterized, first by the form of its free end portion and, second, by the fact that it is attached to the superstructure of the wiper blade either on the top of said superstructure, or in a side-by-side relationship with said superstructure. Therefore, these wiper arms and the corresponding wiper blades are referred to hereunder as being provided with a "dorsal fitting" or as being provided with a "lateral fitting".

The present invention more particularly relates to a connecting device or connector for attaching a wiper blade provided with a dorsal fitting to two different types of wiper arms provided with a lateral fitting, the main difference between said two types of arms being the different width of their free end portions. In a second embodiment of the connecting device according to the invention, said device may be used with two different types of wiper arms provided with a dorsal fitting, as well as with said two wiper arms provided with a lateral fitting.

A large number of connectors for attaching a wiper blade provided with a lateral fitting to a wiper arm provided with a dorsal fitting is known in the prior art. On the other hand, there are rather few connectors for attaching a wiper blade provided with a dorsal fitting to a wiper arm provided with a lateral fitting. A connector substantially similar to the last-mentioned type is disclosed in U.S. Pat. No. 4,118,825 to Hoebrechts et al, issued Oct. 10, 1978, and essentially comprises a connector body releasably secured to the superstructure of the wiper blade and a loose pivot pin which is laterally inserted into said connector body after having been passed through two openings provided in the lateral walls of the free end portion of a wiper arm provided with a lateral fitting.

A first disadvantage of the connecting device disclosed in said U.S. Pat. No. 4,118,825 is that it has not been designed for being mounted on a wiper blade provided with a properly so called dorsal fitting, since the wiper blade disclosed in said patent does not comprise means for attaching to it a wiper arm provided with a dorsal fitting. In other words, before the mounting of the connector or connectors onto the wiper blade, said wiper blade, as disclosed in the patent, does not, for example, include a pivot pin for securing thereon a wiper arm provided with a dorsal fitting.

A second disadvantage of the connecting device disclosed in U.S. Pat. No. 4,118,825 is the fact that it can only be used with one single type of wiper arm provided with a lateral fitting. In one of the embodiments of the connecting device disclosed in said U.S. patent, the pivot pin is either a bolt with a nut, or a pin with a circlip. In these two cases, it is therotetically possible to attach this connecting device to two arms of different widths, but two bolts or pins of different lengths are then needed. Another disadvantage of the bolts or pins of this type is the fact that the nut may come unscrewed or the circlip may come loose when the wiper blade is working, or, on the contrary, both the nut and the circlip may rust up and thus make it very difficult to dismount the wiper blade from its wiper arm.

The present invention is directed to overcoming one or more of the problems as set forth above.

DISCLOSURE OF INVENTION

The superstructure of a wiper blade provided with a dorsal fitting generally comprises, at its upper central portion, a substantially rectangular opening wherein is located a first pivot pin which links together the two flanges of said superstructure. According to the invention, the body of the connecting device is secured or snap-fitted in a known manner onto said first pivot pin. A second pivot pin is then inserted, through lateral openings provided in the free end portion of the wiper arm, either from one side or from the other side, into a unique transversal opening provided in the body of the connecting device, said second pivot pin making it possible to attach either one wiper arm of one type on one side of the superstructure of the wiper blade or another wiper arm of another type on the other side of said superstructure.

A first object of the present invention is thus to realize a connecting device for attaching a wiper blade provided with a dorsal fitting to a wiper arm provided with a lateral fitting.

A second object of the invention is to realize a connecting device for attaching a wiper blade provided with a dorsal fitting to two different types of wiper arms provided with a lateral fitting.

A third object of the invention is to realize a connecting device for attaching a wiper blade provided with a dorsal fitting not only to two wiper arms provided with a lateral fitting, but also to one or more types of wiper arms provided with a dorsal fitting.

A fourth object of the invention is to realize a connecting device comprising the least possible parts in order to facilitate its mounting on the blade and the arm and in order to diminish its production costs.

A fifth object of the invention is to realize a connecting device which is the least possible or not at all subject to rust in avoiding any metal-to-metal contact between the different parts of the device.

BRIEF DESCRIPTION OF DRAWINGS

FIG. 1 is a side elevational view of a first type of wiper arm provided with a lateral fitting;

FIG. 2 is a top view of the wiper arm of FIG. 1;

FIG. 3 is a side elevational view of a second type of wiper arm provided with a lateral fitting;

FIG. 4 is a top view of the wiper arm of FIG. 3;

FIG. 5 is a perspective view of the upper central portion of the superstructure of a wiper blade provided with a dorsal fitting;

FIG. 6 is a perspective view of a first embodiment of the body of the connecting device according to the invention;

FIG. 7 is a side elevational view of a first embodiment of the second pivot pin;

FIG. 8 is a side elevational view of a second embodiment of the second pivot pin;

FIG. 9 is a side elevational view of a third embodiment of the second pivot pin;

FIG. 10 is a longitudinal sectional view of the body of the connecting device, along line X—X of FIG. 6.

FIG. 11 is a transverse sectional view of the body of the connecting device along line XI—XI of FIG. 10;

FIG. 12 is a sectional view similar to the one of FIG. 11, with the wiper arm of FIGS. 1 and 2 mounted on the body of the connecting device by means of the pivot pin of FIG. 7;

FIG. 13 is a sectional view of the connecting device according to a variant of FIG. 11, with the wiper arm of FIGS. 3 and 4 mounted on said body of the connecting device by means of the pivot pin of FIG. 8;

FIG. 14 is a sectional view of the connecting device according to another variant of FIG. 11, with the wiper arm of FIGS. 1 and 2 mounted on said body of the connecting device by means of the pivot pin of FIG. 9;

FIG. 15 is a side elevational view of the upper central portion of the superstructure of a wiper blade with the body of the connecting device, according to a second embodiment, mounted on said superstructure;

FIGS. 16 and 17 are perspective views of two types of hook end wiper arms which can be mounted directly on the body of the connecting device of FIG. 15;

FIG. 18 is a bottom view of the body of the connecting device of FIG. 15;

FIG. 19 is a longitudinal sectional view of the connecting device along line XIX—XIX of FIG. 18; and FIG. 20 is a transverse sectional view, at a larger scale, of the body of the connecting device along line XX—XX of FIG. 15, designed for use with the pivot pin of FIG. 9.

BEST MODE FOR CARRYING OUT THE INVENTION

The scale of FIGS. 1 to 4 is the actual scale, for FIGS. 5 to 19 the scale is substantially equal to two times the actual scale and for FIG. 20 the scale is substantially equal to three times the actual scale.

FIGS. 1 and 2 show a first type of wiper arm 1 provided for use with a lateral fitting, the free end portion of which, substantially in the form of an inverted U, comprises two flanges 3, each provided with a circular opening 4 surrounded by a lug 5. A pivot pin may be inserted into said two circular openings 4 and is or may be maintained in its working position by the resilient blade 6 which snaps into a central and cylindrical recess provided on the pin (not shown).

FIGS. 3 and 4 show a second type of wiper arm 2 provided with a lateral fitting, similar to arm 1, i.e. comprising two flanges 7, two circular openings 8 and a resilient blade 9, but not provided with lugs surrounding said curcular openings 8.

An essential difference between the wiper arm 1 and the wiper arm 2 is the fact that the overall width of their free end portion is not the same. Indeed the width 11 of the arm 2 is larger than the width 10 of the arm 1. Because of these different widths, any connector, which is to be used interchangeably with one or the other of the two arms 1,2, must be especially designed for this purpose. Designing such a connector is one of the objects of the present invention.

FIG. 5 shows the upper central portion of the superstructure 12 of a wiper blade provided for use with a dorsal fitting. Such a superstructure has generally the form of an inverted U comprising a web 13 and two lateral flanges 14. Over part of its length, the web 13 is provided with a substantially rectangular opening 17 wherein a rivet or pivot pin 15 links togehter the two flanges 14 of the superstructure 12. By means of known connectors or connecting devices, the pivot pin 15 of this type of wiper blade may be pivotally secured to different types of known wiper arms provided with a dorsal fitting. According to one of the embodiments of the present invention, the two flanges 14 of the superstructure 12 also comprise two circular openings 16. The utility of these openings 16 will be explained hereunder when describing the corresponding embodiment.

FIG. 6 shows, in a perspective view, a first embodiment of the body 18 of the connecting device whereon one or the other of the pivot pins 23, 27, 35 (FIGS. 7, 8, 9), which may be made of steel, will be mounted.

The body 18 of the connecting device A comprises known locking means 21 for releasably securing it on the pivot pin 15 of the superstructure 12 of a wiper blade. The known locking means 21 essentially comprise two surfaces 44, 45 converging towards the seat 43 of the pivot pin 15, said seat 43 being open towards said two surfaces 44, 45. A slot 46 increases the resiliency of the locking means 21 which, just as the whole body 18 of the connecting device A, are made out of an appropriate plastic material.

The locking means 21 are complemented by two intermediate portions 20, slightly inclined one with respect to the other, and resting on the upper lateral edges 14a of the superstructure 12 of the wiper blade, when the body 18 of the connecting device A is mounted on the pivot pin 15 of said superstructure 12.

Lastly, the body 18 of the connecting device A comprises, above the two intermediate portions 20, a third portion 19 with a substantially cylindrical outer surface. Said third portion 19 is provided with a unique transverse opening 22 into which one or the other of the three pivot pins 23, 27, 35 (FIGS. 7, 8, 9) may be inserted either from one side or from the other side of the body 18 of the connecting device A.

Thus, when the complete connector is mounted on the superstructure 12, the assembly superstructure-connector comprises two superposed pins, the first one being the pin 15 of the superstructure 12 and the second one being one or the other of the pivot pins 23, 27, 35. It is, however, to be noted that in this first embodiment of the invention, the pin 15 of the superstructure 12 is no longer a pivot pin, but only a means for securing the body 18 of the connecting device onto the superstructure 12. Of course, it is quite evident that the connecting device according to the invention may either be a loose connector, i.e. releasably mounted on the pin 15 of the superstructure 12, or a connector which is fixedly secured to said pin 15.

The three pivot pins 23, 27, 35 of FIGS. 7, 8 and 9, each comprise three portions:

a first portion 26, 33, 38 which is inserted into the opening 22 of the body 18 of the connecting device and which includes locking means, a second portion 25, 29, 37 which remains outside of the opening 22 of the body 18 of the connecting device and which has a uniform circular cross section, a third portion 24, 28, 36 which has the form of a shouldering located at the free end portion of said second portion.

On FIG. 7, the locking means of the pin 23 is embodied in the form of a screw thread and in fact this pin may be an ordinary screw. Preferably this screw will be provided with a thread such that the twisting moment for unscrewing is larger than the twisting moment for screwing the pin 23 into the opening 22 of the body 18 of the connecting device. Such screws are known on the market.

On FIG. 8, the locking means of the pin 27 are embodied in the form of a diminished cross section 30 and on FIG. 9 the locking means of the pin 35 are embodied in the form of an enlarged cross section 39.

FIG. 10 is a longitudinal sectional view of the body 18 of the connecting device A along line X—X of FIG. 6 and shows the same elements already visible on said FIG. 6.

FIG. 11 shows the body 18 of the connecting device A in a transverse sectional view —along line XI—XI of FIG. 10 —when the pivot pin 23, i.e. the screw, is used. It is first to be noted that the unique opening 22 goes clean through the whole body 18 of the connecting device and that no thread is provided inside said opening 22. The pin 23 thus may be screwed into the opening 22 either from one or from the other side of the opening 22.

On one of its extremities, the opening 22 is provided with a first circular enlargement 47. The diameter of this enlargement 47 is slightly superior to the diameter of the second portions 25, 29, 37 of the three pivot pins 23, 27, 35, being understood that the diameter of said portions 25, 29, 37 of the pivot pins 23, 27, 35 are equal. Indeed, before one or the other of the pins 23, 27, 35 is mounted on the body 18 of the connecting device, they are first inserted completely either into the openings 4 of the wiper arm 1, or into the openings 8 of the wiper arm 2. The openings 4, 8 having the same diameter, the three portions 25, 29, 37 of the pins 23, 27, 35 necessarily must also have a same diameter.

The width of the enlargement 47 depends on the difference between the widths 10, 11 of the wiper arms 1, 2. This difference of width must be compensated in order to avoid any excessive play of the wiper arm 1 on the pivot pins 23 and 35. Indeed, the pivot pins 23, 35 are provided respectively with the shoulderings 25a, 37a which limit the cylindrical portions 25, 37 to exactly the same length as the width 11 of the wiper arm 2. Now, the width 11 is superior to the width 10 of the wiper arm 1.

Referring now to FIG. 11, the wiper arm 2 will always be mounted on the left side of the body 18 of the connecting device, i.e. on the side where there is no enlargement of the opening 22. On the contrary, the wiper arm 1 will always be mounted on the right side of said body 18, i.e. on the side where the enlargement 47 makes it possible to compensate the difference of width between the wiper arm 2 and the wiper arm 1.

As a matter of fact, the opening 22 of FIG. 11 comprises a second circular enlargement 48, the diameter of which is slightly superior to the one of the lugs 5 of the wiper arm 1. This second enlargement 48 makes it possible to locate said lugs 5 inside the body 18 of the connecting device. This disposition guarantees a better guidance of the wiper arm 1 and a less important wear of the body 18 by the lugs 5. It is to be noted that this second enlargement is not shown on the following figures.

FIG. 12 shows the wiper arm 1 mounted on the body 18 of the connecting device A by means of the screw 23. The shouldering 25a of the screw 23 rests on the bottom of the enlargement 47 and consequently the length of the cylindrical portion 25 of the screw 23, which is outside of the body 18, has been diminished so as to correspond exactly to the width 10 of the wiper arm 1. On the same FIG. 12, the possible mounting of the wiper arm 2, also by means of the screw 23, is indicated in dotted lines. In this case, the shouldering 25a of the screw 23 rests on the outer lateral surface of the body 18 of the connecting device A and the length of the cylindrical portion 25 of the screw 23, which is outside of the body 18, corresponds exactly to the width 11 of the wiper arm 2.

On FIG. 13, the wiper arm 2 is mounted on the body 18 of the connecting device A by means of the pivot pin 27, whilst in dotted lines is shown the possible mounting of the wiper arm 1. In this embodiment, the enlargement 47 of the opening 22 is not necessary. Indeed, the pin 27 is locked in the body 18 of the connecting device by a diminished cross section 42 of the opening 22, said diminished cross section snapping into the corresponding diminished cross section 30 of the pivot pin 27. The diminished cross section 42 thus determines the position of the pin 27 in the body 18 of the connecting device A. Consequently, in displacing said diminished cross section slightly towards the left, with respect to the center of the opening 22, the length of the cylindrical pin portion 29, which will be outside of the left side wall of the body 18, will be greater in length of the pin portion 29 which will be outside of the right side wall of said body 18. In fact, the position of the diminished cross section 42 is chosen in such a way that the length of the cylindrical portion 29, which is outside of the left side wall of the body 18, will be equal to the width 11 of the wiper arm 2 and that the length of the cylindrical portion 29, which will be outside of the right side wall, will be equal to the width 10 of the wiper arm 1.

On FIG. 14, the compensation of the difference between the width 10 of the wiper arm 1 and the width 11 of the wiper arm 2 is realized in the same manner as on FIG. 12, but instead of the screw 23, the pin 35 is used for securing the wiper arm 1 and possibly the wiper arm 2 (dotted lines) on the body 18 of the connecting device A and the pin 35 is locked in the opening 22 by the enlarged cross section 38 (FIG. 9) which snaps into the corresponding enlarged cross section 49 of said opening 22.

Referring once more to FIGS. 8, 9, 13 and 14, it is to be noted that the pivot pin 27 is provided with a free end portion which has the form of a frustrum of a cone 34 having a relatively low gradient in order to facilitate its insertion into the opening 22 of the body of the connecting device. On the contrary, the diminished cross section 30 of the same pin 27 is connected to the adjacent portions of the pin by the frustrums of a cone 31, 32 having a higher gradient, this in order to increase the force which is necessary for drawing the pin out of the opening 22.

On the other hand, the enlarged cross section 39 of the pivot pin 35 is connected to the adjacent portions of this pin by two frustrums of a cone 40, 41 having different gradients: towards the free end portion of the pin, the gradient of the frustrum of a cone 41 is low in order to facilitate the insertion of the pin 35 into the opening 22, but towards the other portion of the pin, the gradient of the frustrum of a cone 40 is higher in order to increase the force which is necessary for drawing the pin out of the opening 22.

On the FIGS. 12, 13 and 14, the wiper arm 1 is always mounted on the right side of the body 18 of the connector and the wiper arm 2 is always mounted on the left side of the body 18 of the connector. In other words, the enlargement 47 corresponding to the wiper arm 1 is always on the left side of this arm. One might therefore assume that the connector, and thus the wiper blade, could only be mounted on the left side of the wiper arm 1 or on the right side of the wiper arm 2. This, however, is not so because it will suffice to withdraw the body 18 of the connector from the pivot pin 15 of the wiper blade, to turn it by 180°, and to resnap it onto said pivot pin 15. Now the wiper blade may be mounted on the right side of the wiper arm 1 and on the left side of the wiper arm 2. The possibility to mount the wiper blade either on the right or on the left side of the two wiper arms 1, 2 is important because on the market there are left-hand drive, as well as right-hand drive motor vehicles and in the two cases, the wiper blades are not mounted on the same side of the wiper arms.

For mounting a wiper blade on one of the wiper arms 1, 2, the way to proceed is as follows:

- the pivot pin 23, 27, 35 is pushed through the openings 4, 8 of the wiper arm in such a way that the wiper blade may be mounted on the side of the wiper arm which corresponds to the type of the vehicle,
- the body 18 of the connector is turned in such a way that the pivot pin 23, 27, 35 points towards the extremity of the opening 22 corresponding to the type 1, 2 of the wiper arm which is mounted on the vehicle,
- the pivot pin 23, 27, 35 is screwed or pushed into the opening 22, completely for the screw 23 and up to the snapping point for the two other pins 27, 35,
- the body 18 of the connector is snapped onto the pivot pin 15 of the wiper blade.

In order to facilitate and to avoid msitakes when mounting the connector, its upper portion 19 (FIG. 6) will be marked at its two lateral extremities with, for example, a schematic drawing of the wiper arm 1 on one side and with a schematic drawing of the wiper arm 2 on the other side. These marks are absolutely necessary when the pivot pin 27 (FIG. 13) is used, because then the two extremities of the opening 22 of the body 18 of the connector are identical, at least if there is no second enlargement 48 (FIG. 11).

FIG. 15 shows, in a lateral side elevational view and mounted on the superstructure 12 of a wiper blade, a second embodiment of the body 50 of the connecting device B according to the invention. Just as in the preceding embodiment, the body 50 of the connecting device B is snap-fitted onto the rivet 15 of the wiper blade.

The body 50 is provided with known means for releasably attaching thereto one or the other of the hook end wiper arms 52, 53 shown on FIGS. 16 and 17. These known means essentially comprise (FIGS. 18, 19) a curved surface 58 and two flat surfaces 56, 57 as well as two projections 54, 55 which are part of a resilient portion of the two lateral walls 59 of the body 50 of the connecting device. When one of the two hook end arms 52, 53 is mounted on the connecting device, the inner surface of the hook is in contact, all along its length, with said surfaces 56, 57, 58 and the hook is kept against these surfaces by the two projections 54, 55.

Just as in the first embodiment, the body 50 of the connecting device B, according to the second embodiment, comprises a unique opening into which the pivot pins 23, 27, 35 may be inserted either from one side or from the other side of said body 50 and the locking means of said pins 23, 27, 35 are exactly the same as in the three variants of the first embodiment. By way of example, see FIGS. 18 and 20, the variant with the enlarged cross section 49 of the opening 22, i.e. the pin 35, has been chosen for this second embodiment of the invention. The opening 22, therefore, comprises, slightly displaced towards the left side (FIG. 20) with respect to its center, the enlarged cross section 49 cooperating with the enlarged cross section 39 of the pivot pin 35.

When the body 50 of the connecting device B is in its working position (FIG. 15), the opening 22, which is laterally displaced with respect to the seat 43 (FIG. 19) of the pivot pin 15 of the wiper blade, is located between the two lateral flanges 14 of the wiper blade. In view of the insertion of the pivot pin 23, 27, 35 into said opening 22, it is, therefore, necessary to provide a corresponding circular opening 16 in both flanges 14 of the superstructure 12 of the wiper blade.

The three pivot pins 23, 27, 35 to be used in this second embodiment are principally the same as those used in the first embodiment. However, their cylindrical portions 25, 29, 37 will be longer than in the first embodiment because account must be taken of the thickness of the flanges 14 of the superstructure 12 of the wiper blade (FIG. 20).

In the second embodiment, the way to mount the wiper blade on the left or on the right side of one of the wiper arms 1, 2 is somewhat different. Indeed, if in the first embodiment the body 18 of the connecting device A had to be turned by 180° around a vertical axis, in the present case the body 50 of the connecting device B must be turned by 180° around a horizontal axis. In other words, the body 50 must be snap-fitted on the pivot pin 15 of the wiper blade from below and not from above.

Lastly, when mounting one of the wiper arms 1, 2 on the connecting device B, according to the second embodiment, it is absolutely necessary to first snap-fit the body 50 of the connecting device B onto the pivot pin 15 of the wiper blade and to place the opening 22 in line with the circular openings 16 of the flanges 14 of the wiper blade, before inserting the pivot pin 23, 27, 35 into the opening 22.

FIGS. 15, 18 and 19 show a connecting device on which it is possible to mount not only the arms 1, 2, but also, in a known manner, one or the other of the hook end arms 52, 53. The embodiment shown on FIGS. 15, 18 and 19 has, however, only been chosen by way of example, because it is quite evident that in modifying, in a known manner, the form and the locking means of the body 50 of the connecting device B, other types of arms may be attached thereto, for example bayonet-type arms instead of the hook end arms 52, 53.

The same reasoning may be applied to the first embodiment of the present invention: the upper portion 19 of the body 18 of the connecting device A may easily be adapted, in a known manner, for receiving either hook end or bayonet-type arms, or even other types of arms. For example, the locking means of the hook end arms of the body 50 (FIGS. 18 and 19) may be adapted to the body 18: the hooks would surround the opening 22 of said body 18 and the two intermediate parts 20 would be suppressed in order to allow the body 18 to pivot around the pivot pin 15 of the wiper blade.

Furthermore, the pivot pin 15 of the wiper blade is not indispensable in the first embodiment of the present invention because the locking means 21 may easily be replaced by other means, such as, for example, resilient hooks which grip beneath the lateral flanges 14 of the wiper blade.

Lastly, the second pivot pin 23, 27, 35 may receive not only the wiper arms 1, 2 provided with a lateral fitting, but also, by means of appropriate and known connectors other types of arms, such as, for example, hook end arms (see U.S. Pat. No. 4,118,825) or bayonet-type arms.

Thus, it will be understood that the invention is not limited to the exact embodiments shown and described, but that various changes and/or modifications may be made without departing from the spirit and scope of the invention as defined in the appended claims.

We claim:

1. A connecting device for attaching one side of a wiper blade to one of two wiper arms of different types (1,2), one type of wiper arm (1) having a width less than the width of the other type of wiper arm (2), wherein the superstructure (12) of the wiper blade comprises a first pivot pin (15) onto which is fixedly or releasably secured the body (50) of said connecting device and wherein the free end portion of the two types of wiper arms has substantially the shape of a U of which two flanges (3,7) are provided each with a circular opening (4,8), characterized in that the connecting device comprises a second pivot pin (23) having a first portion which may be threaded from both sides into an opening (22) extending through the body (50) of the connecting device and having a circular enlargement (47) on one side of the body (50) adjacent one of the sides of the superstructure (12), said second pivot pin (23) permitting the attaching of the one type of wiper arm (1) to the one side of the superstructure (12) and the attaching of the other type of wiper arm (2) on either side of said superstructure (12).

2. A device according to claim 1, characterized in that said opening (22) has substantially the shape of a cylinder of which the longitudinal axis is substantially perpendicular to the lateral flanges (14) of the superstructure (12) of the wiper blade.

3. A device according to claim 2, characterized in that said second pivot pin (23) comprises three portions:
   the first portion (26) which is inserted into the opening (22) of the body (50) of the connecting device and which comprises locking means (26),
   a second portion (25) which remains outside of the opening (22) of the body (50) of the connecting device and which has a uniformly circular cross section, and
   a third portion (24) which forms a shoulder at the free end portion of said second section (25).

4. A device according to claim 3, characterized in that the second pivot pin is a screw (23).

5. A device according to claim 4, characterized in that said screw (23) is provided with a thread (26) such that the twisting moment for unscrewing is greater than the twisting moment for screwing.

6. A device according to claim 4 or 5, characterized in that said opening (22) of the body (50) of the device has a smooth continuous wall throughout its length between the other side of the body and the enlargement (47).

7. A device as claimed in claim 3 characterized in that the circular enlargement (47) is of a size which substantially corresponds to the cross section of said second portion (25) of the second pivot pin (23).

8. A device according to claim 3, characterized in that, when said device is in its working position, the second pivot pin (23) is substantially located at the same level as the first pivot pin (15), but laterally displaced with respect thereto.

9. A connecting device according to claim 8 wherein the first pivot pin (15) links together the two flanges (14) of the superstructure (12) of the wiper blade, characterized in that said flanges (14) have a circular opening (16) which is in alignment with said opening (22) of the body (50) of the connecting device when the latter is in its working position.

10. A connecting device according to claim 2, characterized in that said superstructure (12) is provided with two lateral openings (16) in alignment with the opening (22) of the body of the connecting device.

11. A connecting device as claimed in claim 8, characterized in that said body (50) of the device is provided with locking means (55, 56, 57, 58) for attaching thereto other types of wiper arms.

12. A connecting device as claimed in claim 1, characterized in that the body (50) of the device is made of one piece, for example of an appropriate plastic material, and that said second pivot pin (23) is made out of steel.

* * * * *

UNITED STATES PATENT AND TRADEMARK OFFICE
CERTIFICATE OF CORRECTION

PATENT NO. : 4,354,293

DATED : OCTOBER 19, 1982

INVENTOR(S) : Robert T. LeSausse and Johan H. van den Berg

It is certified that error appears in the above-identified patent and that said Letters Patent are hereby corrected as shown below:

Column 3, line 66, change "togehter" to read --together--.

Column 4, line 25, delete "respect to the other, and resting on the upper lateral", which phrase is a repeat of line 24.

Column 6, line 39, change "38" to read --39--.

Signed and Sealed this

Eighth Day of February 1983

[SEAL]

Attest:

GERALD J. MOSSINGHOFF

Attesting Officer

Commissioner of Patents and Trademarks